(12) United States Patent
Iitsuka

(10) Patent No.: US 7,281,107 B2
(45) Date of Patent: Oct. 9, 2007

(54) STORAGE SYSTEM, DATA MIGRATION MANAGING SYSTEM, AND DATA MIGRATION MANAGING METHOD

(75) Inventor: Takayoshi Iitsuka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 232 days.

(21) Appl. No.: 11/150,410

(22) Filed: Jun. 10, 2005

(65) Prior Publication Data

US 2006/0236055 A1    Oct. 19, 2006

(30) Foreign Application Priority Data

Apr. 13, 2005    (JP) .............................. 2005-116303

(51) Int. Cl.
*G06F 12/14* (2006.01)
(52) U.S. Cl. ...................... 711/165; 711/152
(58) Field of Classification Search ................ 711/165
See application file for complete search history.

(56) References Cited

U.S. PATENT DOCUMENTS 6,356,977 B2 * 3/2002 Ofek et al. ................. 711/112

2003/0233162 A1 * 12/2003 Kawai et al. ............... 700/116
2004/0268038 A1    12/2004 Nagasoe et al.

FOREIGN PATENT DOCUMENTS

| JP | 2003-058397 | 2/2003 |
|---|---|---|
| JP | 2004-078331 | 3/2004 |

\* cited by examiner

*Primary Examiner*—Gary Portka
*Assistant Examiner*—Hamdy S Ahmed
(74) *Attorney, Agent, or Firm*—Townsend and Townsend and Crew LLP

(57) ABSTRACT

A data migration management system for preventing alteration such as rewriting or deletion, and migrating data between storage systems during an alteration prevention term. This data migration management system copies data from a logical device of a source storage system to a logical device of a destination storage system, and sets an alteration prevention setting for the destination logical device. Once the data migration management system acquires an alteration prevention status report from the destination storage system and confirms that the data has been migrated without alteration, it cancels the alteration prevention setting of the source storage system.

8 Claims, 15 Drawing Sheets

FIG.3

| LDEV NUMBER | LDEV IMPLEMENTATION BIT | ALTERATION PREVENTION BIT | ALTERATION PREVENTION DEADLINE | MIGRATION-PERMITTED START DATE | MIGRATION PERMITTED DEADLINE | MIGRATION EXTENSION TERM | DATA IDENTIFICATION INFORMATION |
|---|---|---|---|---|---|---|---|
| LDEV#0 | 1 | 0 | 00000000 | 00000000 | 00000000 | 0 | 00000000 |
| LDEV#1 | 1 | 1 | 20090108 | 20060108 | 20060208 | 7 | 77D1DDED |
| LDEV#2 | 1 | 1 | 20080131 | 20050131 | 20050315 | 30 | 12B6BD59 |
| LDEV#3 | 1 | 1 | 20071220 | 20051220 | 20060110 | 7 | 59594E4F |
| LDEV#4 | 1 | 0 | 20080115 | 20050115 | 20050131 | 15 | 00000000 |

103

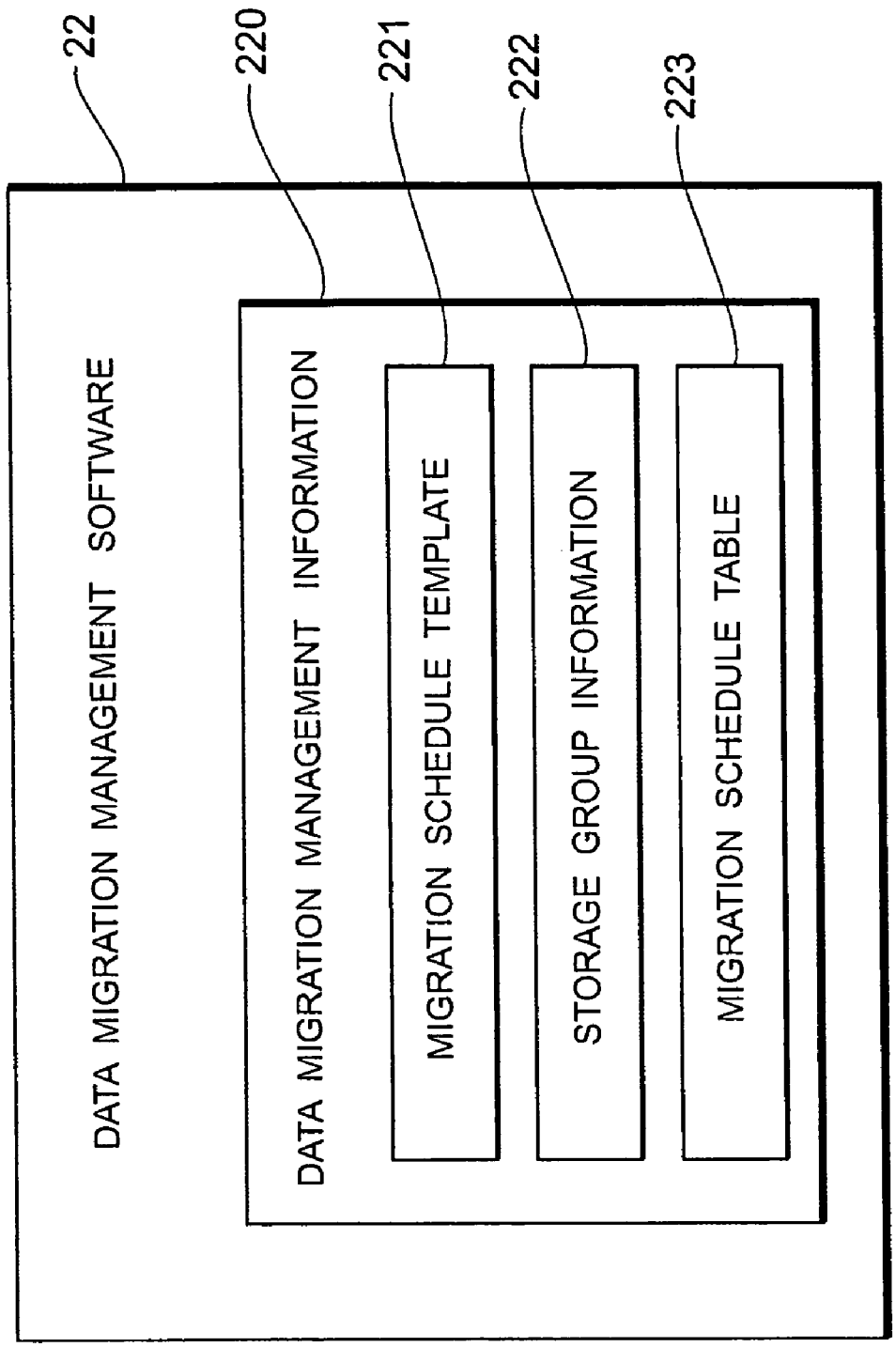

| | | |
|---|---|---|
| 311-1 | DATA IDENTIFICATION INFORMATION | TO BE DECIDED |
| 311-2 | DATA SIZE | TO BE DECIDED |
| 312-1 | STORAGE POLICY NAME | REGULATION A COMPLIANCE |
| 312-2 | ALTERATION PREVENTION TERM | 30 YEARS |
| 312-3 | NUMBER OF DESTINATION STORAGE SYSTEMS | N |
| 313-1 | ALTERATION PREVENTION STORAGE TERM | 6 MONTHS |
| 313-2 | FALSIFICATION PREVENTION STORAGE START DATE | TO BE DECIDED |
| 313-3 | ALTERATION PREVENTION STORAGE DEADLINE | TO BE DECIDED |
| 313-4 | MIGRATION-PERMITTED START DATE | 1 DAY |
| 313-5 | MIGRATION-PERMITTED TERM | 5 DAYS |
| 313-6 | MIGRATION EXTENSION TERM | 1 DAY |
| 313-7 | STORAGE GROUP NAME | SLOW_FC |
| 313-8 | VENDOR NAME | TO BE DECIDED |
| 313-9 | DEVICE NAME | TO BE DECIDED |
| 313-A | SERIAL NUMBER | TO BE DECIDED |
| 313-B | LOGICAL DEVICE NUMBER | TO BE DECIDED |
| 314-1 | ALTERATION PREVENTION STORAGE TERM | 3 YEARS |
| 314-2 | ALTERATION PREVENTION STORAGE START DATE | TO BE DECIDED |
| 314-3 | ALTERATION PREVENTION STORAGE DEADLINE | TO BE DECIDED |
| 314-4 | MIGRATION-PERMITTED START DATE | 1 DAY |
| 314-5 | MIGRATION-PERMITTED TERM | 15 DAYS |
| 314-6 | MIGRATION EXTENSION TERM | 2 DAYS |
| 314-7 | STORAGE GROUP NAME | CURRENT_SATA |
| 314-8 | VENDOR NAME | TO BE DECIDED |
| 314-9 | DEVICE NAME | TO BE DECIDED |
| 314-A | SERIAL NUMBER | TO BE DECIDED |
| 314-B | LOGICAL DEVICE NUMBER | TO BE DECIDED |
| | ... | ... |
| 315-1 | ALTERATION PREVENTION STORAGE TERM | 5 YEARS |
| 315-2 | ALTERATION PREVENTION STORAGE START DATE | TO BE DECIDED |
| 315-3 | ALTERATION PREVENTION STORAGE DEADLINE | TO BE DECIDED |
| 315-4 | MIGRATION-PERMITTED START DATE | 1 DAY |
| 315-5 | MIGRATION-PERMITTED TERM | 30 DAYS |
| 315-6 | MIGRATION EXTENSION TERM | 5 DAYS |
| 315-7 | STORAGE GROUP NAME | FUTURE_SATA |
| 315-8 | VENDOR NAME | TO BE DECIDED |
| 315-9 | DEVICE NAME | TO BE DECIDED |
| 315-A | SERIAL NUMBER | TO BE DECIDED |
| 315-B | LOGICAL DEVICE NUMBER | TO BE DECIDED |

FIG.6

| | | 222 |
|---|---|---|
| 411-1 | STORAGE GROUP NAME | CURRENT_SATA |
| 411-2 | NUMBER OF STORAGE SYSTEMS | M |
| 412-1 | FIRST STORAGE VENDOR NAME | HITACHI |
| 412-2 | FIRST STORAGE DEVICE NAME | SANRISE 11111 |
| 412-3 | FIRST STORAGE SERIAL NUMBER | E95353E557A70037 |
| 413-1 | SECOND STORAGE VENDOR NAME | HITACHI |
| 413-2 | SECOND STORAGE DEVICE NAME | SANRISE 22222 |
| 413-3 | SECOND STORAGE SERIAL NUMBER | 4510B780413DBF6C |
| | ... | ... |
| 414-1 | Mth STORAGE VENDOR NAME | HITACHI |
| 414-2 | Mth STORAGE DEVICE NAME | SANRISE 44444 |
| 414-3 | Mth STORAGE SERIAL NUMBER | 3E58C59BBAC95318 |

| | | |
|---|---|---|
| 321-1 | DATA IDENTIFICATION INFORMATION | TO BE DECIDED |
| 321-2 | DATA SIZE | TO BE DECIDED |
| 322-1 | STORAGE POLICY NAME | REGULATION A COMPLIANCE |
| 322-2 | ALTERATION PREVENTION TERM | 30 YEARS |
| 322-3 | NUMBER OF DESTINATION STORAGE SYSTEMS | N |
| 323-1 | ALTERATION PREVENTION STORAGE TERM | 6 MONTHS |
| 323-2 | ALTERATION PREVENTION STORAGE START DATE | TO BE DECIDED |
| 323-3 | ALTERATION PREVENTION STORAGE DEADLINE | TO BE DECIDED |
| 323-4 | MIGRATION-PERMITTED START DATE | 1 DAY |
| 323-5 | MIGRATION-PERMITTED TERM | 5 DAYS |
| 323-6 | MIGRATION EXTENSION TERM | 1 DAY |
| 323-7 | STORAGE GROUP NAME | SLOW_FC |
| 323-8 | VENDOR NAME | TO BE DECIDED |
| 323-9 | DEVICE NAME | TO BE DECIDED |
| 323-A | SERIAL NUMBER | TO BE DECIDED |
| 323-B | LOGICAL DEVICE NUMBER | TO BE DECIDED |
| 324-1 | ALTERATION PREVENTION STORAGE TERM | 3 YEARS |
| 324-2 | ALTERATION PREVENTION STORAGE START DATE | TO BE DECIDED |
| 324-3 | ALTERATION PREVENTION STORAGE DEADLINE | TO BE DECIDED |
| 324-4 | MIGRATION-PERMITTED START DATE | 1 DAY |
| 324-5 | MIGRATION-PERMITTED TERM | 15 DAYS |
| 324-6 | MIGRATION EXTENSION TERM | 2 DAYS |
| 324-7 | STORAGE GROUP NAME | CURRENT_SATA |
| 324-8 | VENDOR NAME | TO BE DECIDED |
| 324-9 | DEVICE NAME | TO BE DECIDED |
| 324-A | SERIAL NUMBER | TO BE DECIDED |
| 324-B | LOGICAL DEVICE NUMBER | TO BE DECIDED |
| | ... | ... |
| 325-1 | ALTERATION PREVENTION STORAGE TERM | 5 YEARS |
| 325-2 | ALTERATION PREVENTION STORAGE START DATE | TO BE DECIDED |
| 325-3 | ALTERATION PREVENTION STORAGE DEADLINE | TO BE DECIDED |
| 325-4 | MIGRATION-PERMITTED START DATE | 1 DAY |
| 325-5 | MIGRATION-PERMITTED TERM | 30 DAYS |
| 325-6 | MIGRATION EXTENSION TERM | 5 DAYS |
| 325-7 | STORAGE GROUP NAME | FUTURE_SATA |
| 325-8 | VENDOR NAME | TO BE DECIDED |
| 325-9 | DEVICE NAME | TO BE DECIDED |
| 325-A | SERIAL NUMBER | TO BE DECIDED |
| 325-B | LOGICAL DEVICE NUMBER | TO BE DECIDED |

FIG.13

----- BEGIN SIGNED MESSAGE -----

Hash:SHA1

\<Vender\> HITACHI \</Vender\>

\<Devicc\> SANRISE 99999 \</Devicc\>

\<Serial Number\> E 95353E557A70037 \</Serial Number\>

\<Retention Period Expiration \> 20091223 \</Retention Period Expiration\>

\<Movable Period Start \> 20060123 \</Movable Period Start \>

\<Data Hash Value \> 7A96FB7CA9C20BD1 \</Data Hash Value \>

----- BEGIN SIGNATURE ----- iQA/AwUBQeb/knTYvGROr91bEQLNmACgiaVgZXMNQCuiCUCF51w+OBFID7
UAoLxkUaV7gRnYOeWeFKFIGIAp+Jwk=OYpo

----- END SIGNATURE -----

STORAGE SYSTEM, DATA MIGRATION MANAGING SYSTEM, AND DATA MIGRATION MANAGING METHOD

CROSS-REFERENCE TO RELATED APPLICATION

This application relates to and claims priority from Japanese Patent Application No. 2005-116303, filed on Apr. 13, 2005, the entire disclosure of which is incorporated herein by reference.

BACKGROUND OF THE INVENTION

The present invention relates to a storage system, a data migration managing system, and a data migration managing method. More particularly, this invention relates to a technique to safely migrate data between logical devices and to prevent alteration such as rewriting or deletion.

Because of the growing demand for security functions in storage systems and to comply with laws and regulations regarding the handling of electronic data, there is an increasing need for a technique to prevent alteration, such as rewriting or deletion, of data written in storage systems and to store the data for a certain period of time. For example, Japanese Patent Laid-Open (Kokai) Publication No. 2005-18568 suggests a technique to prevent alteration, such as rewriting or deletion, of data written in logical devices by setting a read-only attribute for each logical device of storage systems and suppressing any change of the read-only attribute for a certain period of time.

On the other hand, data life cycle management (DLCM) has gained the attention of the public as another technical trend besides the prevention of alteration. DLCM is the concept of realizing cost-efficient data management by migrating data between storage systems based on the value of the data changing over time. For example, a mailing system is the backbone system for a company and, therefore, requires high-end storage systems that exhibit high performance and high reliability. Since access to mail dated several weeks ago becomes less frequent, the relevant data is migrated from high-end storage systems to near-line storage systems. The near-line storage systems are inferior to the high-end storage systems in their performance and reliability, but they have the advantage of low cost and are still accessible at any time. When one or two years have passed since the migration of the data to the near-line storage systems, the data is further migrated to a tape medium, which is then stored in a depository. According to the concept of DLCM, data migration management is important in order to reduce the cost of data management.

As an example of a data migration management technique, Japanese Patent Laid-Open (Kokai) Publication No. 2003-58397 discloses a file managing apparatus for, when storing a file in an information storage device connected to a network, managing a file storage deadline in the information storage device that stores the file and automatically migrating the file to another storage device before the file storage deadline. Moreover, Japanese Patent Laid-Open (Kokai) Publication No. 2004-78331 discloses a file relocation system for migrating a file that has been stored in a common storage area beyond a specified storage deadline, to a safe area, migrating the file that has been stored in the safe area beyond a specified storage deadline, to an external storage device, and restoring the file to the source storage area when a computer or a file server makes reference to the file.

SUMMARY OF THE INVENTION

According to Japanese Patent Laid-Open (Kokai) Publication No. 2005-18568, it is possible to store data for a certain period of time while preventing alteration such as rewriting or deletion. However, if the life of the relevant storage system ends before the legal storage term expires, it is necessary to migrate the data to another storage system. It is also conceivable that it may be necessary to migrate the data between storage systems in order to implement DLCM. Japanese Patent Laid-Open (Kokai) Publication No. 2005-18568 does not refer to any technique to safely migrate data to another storage system by preventing alteration such as rewriting or deletion under the above-described circumstances.

Likewise, Japanese Patent Laid-Open (Kokai) Publications Nos. 2003-58397 and 2004-78331 do not refer to the data migration between storage systems while preventing alteration such as rewriting or deletion. For example in order to comply with laws and regulations, it is necessary to store data on WORM (Write Once Read Many) media for a certain period of time. Users would want to ultimately store the data on WORM tape media, but they tend to desire the storage of the data on disks for a certain period of time in consideration of high-speed access performance and recovery needs. If an attempt is made to migrate the data stored on disks, having the read-only attribute setting for the prevention of alteration, to another storage system during a legal storage term, it is possible to copy the data to the destination storage system (to which the data is migrated), but it is impossible to delete the data in the source storage system (from which the data is migrated). Accordingly, the storage area of the source storage system in which the target data was written cannot be reused and it is impossible to reduce the data management cost.

Furthermore, with Japanese Patent Laid-Open (Kokai) Publications Nos. 2005-18568, 2003-58397, and 2004-78331, when the data is migrated between the storage systems during the legal storage term, it is impossible to guarantee the prevention of alteration and to set an alteration prevention setting for the destination storage system.

The present invention aims to solve the above-described problems. It is an object of this invention to migrate data between storage systems during an alteration prevention term while preventing alteration such as rewriting or deletion.

In order to solve the above-described problems, a storage system of this invention includes: a storage device for providing a first logical device; a control memory for storing control information to prevent alteration of data written to the first logical device; and a controller for controlling data reading from and writing to the first logical device, based on the control information. The control information includes: an alteration prevention deadline that indicates a deadline for prohibiting alteration of data written to the first logical device; a migration-permitted term that indicates a term for permitting data migration to a second logical device by the alteration prevention deadline for the data written in the first logical device; and data identification information for identifying whether the data written in the first logical device has been altered or not. Conditional upon the data written in the first logical device, which has an alteration prevention setting, having been migrated without alteration to the second logical device during the migration-permitted term, the controller cancels the alteration prevention setting of the first logical device.

The controller may receive, from a destination storage system having the second logical device, an alteration prevention status report that indicates whether or not the data written in the first logical device has been migrated without alteration to the second logical device, and the controller may determine based on the alteration prevention status report whether or not the data written in the first logical device has been migrated without alteration to the second logical device during the migration-permitted term.

If the controller fails to acquire the alteration prevention status report during the migration-permitted term, or if the controller acquires the alteration prevention status report during the migration-permitted term, but it can not be determined that the data written in the first logical device has been migrated without alteration to the second logical device during the migration-permitted term, the controller may migrate the data written in the first logical device to the second logical device during a newly set migration-permitted term.

The alteration prevention status report may include: an alteration prevention deadline and a migration-permitted term which are set for the second logical device; data identification information for identifying whether or not the data migrated to the second logical device has been altered; and an electronic signature from the destination storage system. The controller determines that the data written in the first logical device has been migrated without alteration to the second logical device during the migration-permitted term when the following conditions are satisfied: the validity of the electronic signature is verified; the alteration prevention deadline set for the second logical device is identical to the alteration prevention deadline set for the first logical device; a first day of the migration-permitted term set for the second logical device is a future date later than the current date; and the data identification information of the data written in the first logical device is identical to the data identification information of the data written to the second logical device.

The alteration prevention status report may further include a vendor name, a device name, and a serial number of the destination storage system.

A data migration managing system of this invention manages data migration between a first storage system and a second storage system. The first storage system includes: a first storage device for providing a first logical device; a first control memory for storing first control information to prevent alteration of data written to the first logical device; and a first controller for controlling data reading from and writing to the first logical device, based on the first control information. The first control information includes: a first alteration prevention deadline that indicates a deadline for prohibiting alteration of data written to the first logical device; a first migration-permitted term that indicates a term for permitting data migration to a second logical device by the first alteration prevention deadline for the data written in the first logical device; and first data identification information for identifying whether the data written in the first logical device has been altered or not. The second storage system includes: a second storage device for providing a second logical device; a second control memory for storing second control information to prevent alteration of data written to the second logical device; and a second controller for controlling data reading from and writing to the second logical device, based on the second control information. The second control information includes: a second alteration prevention deadline that indicates a deadline for prohibiting alteration of data written to the second logical device; a second migration-permitted term that indicates a term for permitting data migration to a second logical device by the second alteration prevention deadline for the data written in the second logical device; and second data identification information for identifying whether the data written in the second logical device has been altered or not. The data migration managing system includes a migration schedule for managing at least the first alteration prevention deadline and the first migration-permitted term; and if the data written in the first logical device, which has an alteration prevention setting, has been migrated without alteration to the second logical device during the first migration-permitted term, the controller cancels the alteration prevention setting of the first logical device.

The data migration managing system may receive, from the second storage system, an alteration prevention status report that indicates whether or not the data written in the first logical device has been migrated without alteration to the second logical device, and the data migration managing system transfers the alteration prevention status report to the first storage system.

With the data migration managing system of this invention, the first migration-permitted term may be newly set if the first storage system fails to acquire the alteration prevention status report during the first migration-permitted term, or if the first storage system acquires the alteration prevention status report during the first migration-permitted term, but the data written in the first logical device fails to be migrated without alteration to the second logical device during the first migration-permitted term.

A data migration managing method of this invention manages data migration between a first storage system and a second storage system. This method includes the steps of: migrating data written in a first logical device, which belongs to the first storage system and has an alteration prevention setting, to a second logical device of the second storage system by an alteration prevention deadline; and canceling the alteration prevention setting of the first logical device if the data written in the first logical device has been successfully migrated without alteration to the second logical device by the alteration prevention deadline.

The data migration managing method of this invention may further include the steps of: receiving, from the second storage system, an alteration prevention status report that indicates whether or not the data written in the first logical device has been migrated without alteration to the second logical device; and transferring the alteration prevention status report received from the second storage system, to the first storage system.

With the data migration managing method of this invention, a migration-permitted term may be newly set to migrate the data written in the first logical device to the second logical device if the first storage system fails to acquire the alteration prevention status report by the alteration prevention deadline, or if the first storage system acquires the alteration prevention status report by the alteration prevention due data, but the data written in the first logical device fails to be migrated without alteration to the second logical device by the alteration prevention deadline.

According to the present invention, it is possible to carry out the data migration between the storage systems during the alteration prevention term while preventing alteration such as rewriting or deletion.

BRIEF DESCRIPTION OF THE DRAWINGS

FIG. 3 is an explanatory drawing illustrating a table configuration of LDEV control information.

FIG. 4 is a configuration diagram of migration management information.

FIG. 5 is a configuration diagram of a migration schedule template.

FIG. 6 is a configuration diagram of storage group information.

FIG. 7 is a configuration diagram of a migration schedule.

FIG. 13 is a diagram illustrating an example of the alteration prevention status report.

DETAILED DESCRIPTION OF THE INVENTION

An embodiment of this invention is described below in detail with reference to the attached drawings.

Figure 1:
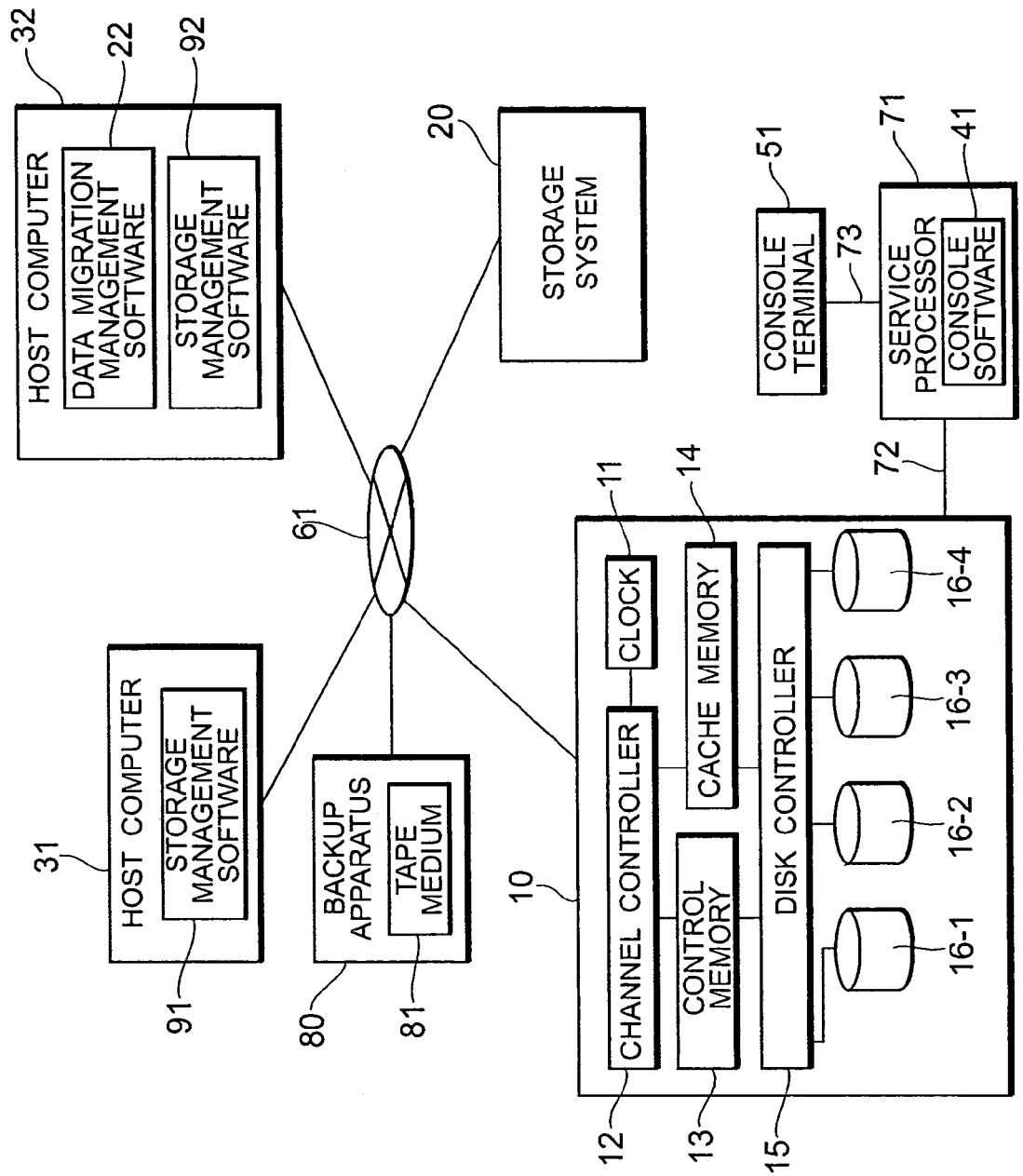
FIG. 1 is a network configuration diagram including a storage system according to an embodiment of this invention.

FIG. 1 shows a network configuration including storage systems 10 and 20 according to this embodiment. A plurality of host computers 31 and 32, a plurality of storage systems 10 and 20, and a backup apparatus 80 are connected via a SAN (Storage Area Network). The storage systems 10 and 20 are, for example, disk array apparatuses in which a plurality of disk drives are located in arrays and which manage data according to their RAID (Redundant Array of Independent (or Inexpensive) Disks) configuration.

The storage system 10 includes: a clock 11; a channel controller 12; a control memory 13; a cache memory 14; a disk controller 15; and a plurality of disk drives 16-1, 16-2, 16-3, and 16-4.

The channel controller 12 controls communication with the host computers 31 and 32. If the host computers 31 and 32 are of the mainframe type, the channel controller 12 includes a mainframe interface in order to conduct communications according to communication protocols such as FICON (Fibre Connection®), ESCON (Enterprise System Connection®), ACONARC (Advanced Connection Architecture®), and FIBARC (Fibre Connection Architecture®). If the host computers 31 and 32 are of the open type, the channel controller 12 includes an open-system interface.

The disk controller 15 controls data read/write operation from and to the disk drives 16-1, 16-2, 16-3, and 16-4. The disk drives 16-1, 16-2, 16-3, and 16-4 are hard disk drives such as ATA (Advanced Technology Attachment) disk drives, SCSI (Small Computer System Interface) disk drives, and Fibre Channel disk drives. The control memory 13 stores LDEV control information for controlling, for example, the alteration preventing setting for each logical device and the data migration management, and other various kinds of information necessary for operation control. The cache memory 14 temporarily stores data read from the disk drives 16-1, 16-2, 16-3, and 16-4, and data to be written to the disk drives 16-1, 16-2, 16-3, and 16-4. The clock 11 is a means for measuring the current date and time and is used to manage, for example, an alteration prevention deadline that is set for each logical device.

The storage system 10 is connected via an internal LAN 72 to a service processor 71. This internal LAN 72 is for operation control and is connected, for example, to the channel controller 12 and the disk controller 15 in the storage system 10. The service processor 71 is connected via a LAN 73 to a console terminal 51. Console software 41 installed in the service processor 71 functions as a Web server for the console terminal 51. In response to a request from the console terminal 51, the service processor 71 can perform management control of the storage system 10, such as addition or reduction of the disk drives 16-1, 16-2, 16-3, or 16-4, changes to the RAID configuration (for example, a change from RAID 1 to RAID 5), confirmation of the operating state of the storage system 10, and identification of faulty parts.

The host computers 31 and 32 run resident-type storage management software 91 and 92. The storage management software 91 and 92 performs various kinds of management control of the storage systems 10 and 20 in response to instructions from application programs installed on the respective host computers 31 and 32. For example, the host computer 32 run data migration management software 22 as an application program for managing the data migration of the storage system 10. The host computer 32 functions as a data migration managing system that performs various kinds of management control such as the alteration preventing setting of each logical device in the storage systems 10 and 20, and data migration management between the storage systems 10 and 20. The alteration prevention setting for each logical device and the data migration management will be described later in detail.

The backup apparatus 80 includes a tape medium 81 and retains a backup of the data stored in logical devices of the storage system 10. The tape medium 81 stores the backup data.

The configuration of the storage system 20 is similar to that of the storage system 10 described above and any detailed description of the configuration of the storage system 20 is thereby omitted.

Figure 2:
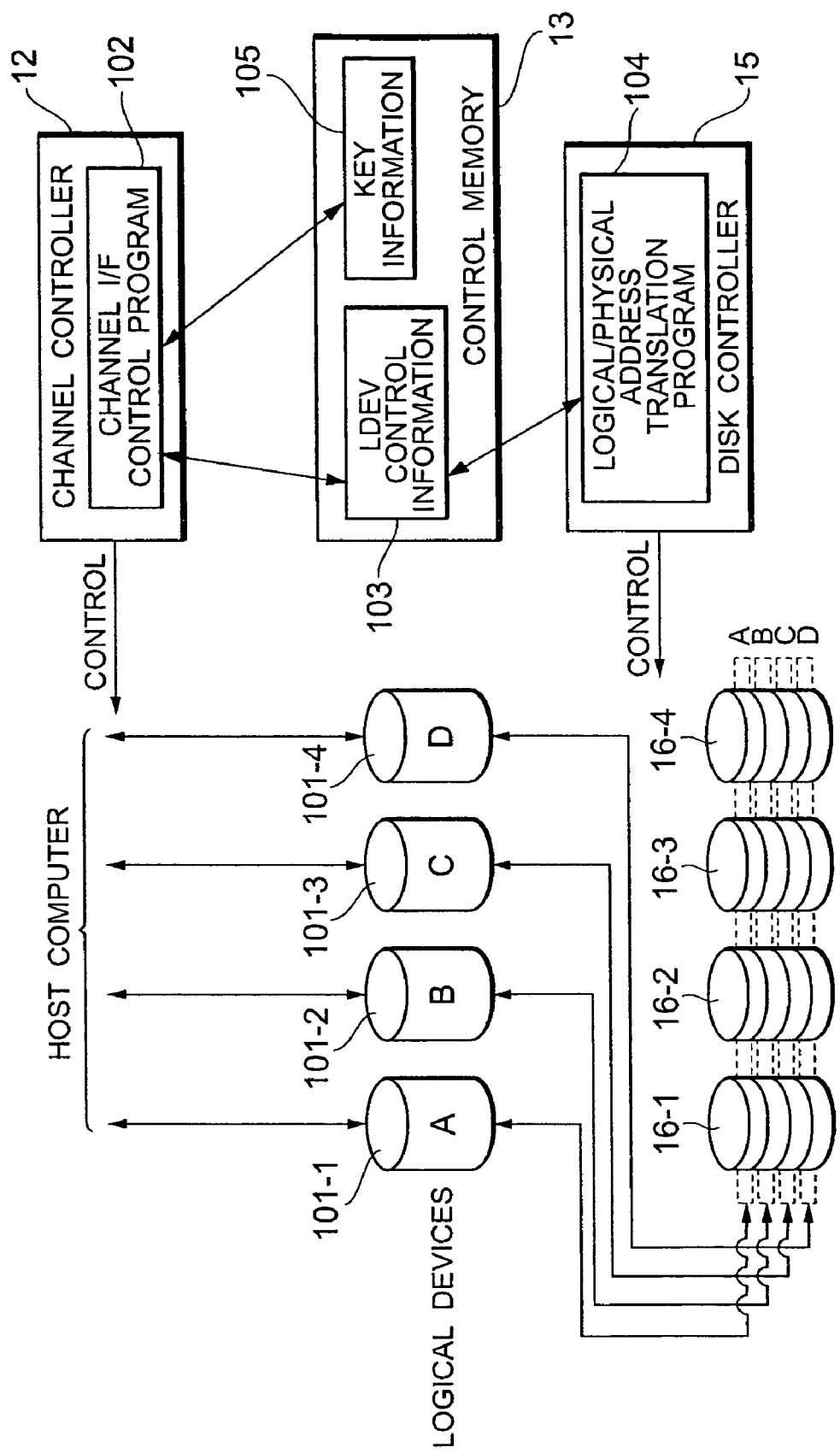
FIG. 2 is an explanatory drawing illustrating the relationship between physical devices and logical devices.

FIG. 2 shows the relationship between the disk drives (physical devices) 16-1, 16-2, 16-3, and 16-4 and logical devices (LDEV) 101-1, 101-2, 101-3, and 101-4. Part of Each logical device 101-1, 101-2, 101-3, and 101-4 is formed on partial storage areas of all the disk drives 16-1, 16-2, 16-3, and 16-4. In short, the logical device 101-1 is supplied as logical device A to the host computers 31 and 32. The other logical devices 101-2, 101-3, and 101-4 are also supplied respectively as logical devices B, C, and D to the host computers 31 and 32.

The control memory 13 stores: LDEV control information 103 for controlling, for example, the alteration prevention setting for each logical device 101-1, 101-2, 101-3, and 101-4, and the data migration management; and key information 105 for attaching an electronic signature to an alteration prevention status report described later, using a public key cipher or the like. The key information 105 is information about, for example, public keys and private keys for which a storage vendor has applied for registration. A channel interface control program 102 installed on the channel controller 12 calculates an LDEV address (a logical address of the relevant logical device) to be accessed, by using information received from the host computers for access to the LDEVs. A logical/physical address translation program 104 installed on the disk controller 15 translates the LDEV address into a PDEV address (a physical address of the relevant physical device). The channel interface control program 102 and the logical/physical address translation program 104 control the access by the host computers 31 and 32 to the logical devices 101-1, 101-2, 101-3, and 101-4 by referring to the LDEV control information 103. The channel interface control program 102 can update the LDEV control information according to instructions from the host computers 31 and 32.

The outline of the data migration managing method according to this embodiment is described below. By the data migration managing method of this embodiment, a storage term for data to be stored in a logical device (hereinafter referred to as the "alteration prevention storage term") is set along with a data storage term specified by law or other arrangements (hereinafter referred to as the "alteration prevention term"). The alteration prevention storage term is determined with reference to, for example, the life span of the storage device in which a relevant logical device is constructed, the access performance, the management cost, and the DLCM-based data migration schedule. If the alteration prevention term of certain data as specified by law is, for example, 30 years, it is possible to determine the alteration prevention storage term as 6 months. If a plurality of logical devices is formed in a storage system, it is possible to set an alteration prevention storage term for each logical device. The alteration prevention storage term is not always set for each logical device, but may be set for each storage device or for each storage system. In the following explanation, "alteration prevention deadline" means the last day of an alteration prevention term, and "alteration prevention storage deadline" means the last day of an alteration prevention storage term.

In order to store data in a certain logical device, an alteration prevention setting as well as the alteration prevention deadline and the alteration prevention storage deadline are set for the logical device. The "alteration prevention setting" herein used means the setting to prohibit rewriting or deletion of data written in the logical device. For example, a setting to permit read access and to prohibit write access (i.e., Read-Only setting) is an alteration prevention setting. Data stored in the logical device beyond the alteration prevention storage deadline can be migrated to another logical device. The data migration may be conducted in files or in blocks. If a source storage system (from which the data is migrated) can confirm successful and safe migration of the data stored in the source logical device to a destination logical device (to which the data is migrated), or if the alteration prevention deadline has passed, the alteration prevention setting of the source logical device can be cancelled. Accordingly, it is possible to guarantee the alteration prevention of the data migration between the logical devices during the alteration prevention term. Moreover, a source logical device whose alteration prevention setting has been cancelled can be utilized to store other data even before the alteration prevention deadline, thereby realizing a reduction in data management cost. It is also possible to employ such a configuration to automatically initialize a logical device whose alteration prevention setting has been cancelled.

FIG. 3 shows a table configuration of the LDEV control information 103. The LDEV control information 103 includes, as information for controlling the alteration prevention setting for each logical device and the data migration management, an LDEV implementation bit, an alteration prevention bit, an alteration prevention deadline, a migration-permitted start date, a migration-permitted deadline, a migration extension term, and data identification information. The LDEV implementation bit is the information that indicates whether or not the LDEV is implemented. If the LDEV implementation bit is "1," this indicates that the LDEV is implemented. If the LDEV implementation bit is "0," this indicates that the LDEV is not implemented. The alteration prevention bit is the information that indicates whether or not the LDEV has an alteration prevention setting. If the alteration prevention bit is "1," this indicates that the LDEV has alteration prevention set. If the alteration prevention bit is "0," this indicates that the LDEV does not have alteration prevention set. The alteration prevention deadline is as described before.

The migration-permitted start date is the first day of a term in which data migration is permitted during the alteration prevention term (hereinafter referred to as the "migration-permitted term"), and is the next day of the alteration prevention storage deadline. In other words, when the alteration prevention storage deadline has passed, the data migration is permitted for a certain period of time. The data migration is permitted for a certain period of time, assuming a case, for example, where the data cannot be migrated immediately due to a system failure or other reasons. The migration-permitted deadline is the last day of the migration-permitted term. Setting the migration-permitted deadline reduces any chance that the pre-migration data may be altered, thereby enhancing the level of security. The migration extension term is the additional term in which data migration is further permitted after the migration-permitted deadline, assuming the circumstances where the alteration prevention status report cannot be acquired during the migration-permitted term, or where the alteration prevention status report is acquired, but it can not be determined that the data written into the logical device has been successfully migrated without alteration to another logical device during the migration-permitted term. The migration extension term indicates the number of extended days. If a new migration-permitted term is to be set, a date after the expiration of the migration extension term following the migration-permitted deadline is set as the new migration-permitted start date. The data identification information indicates whether or not the data stored in each logical device has been altered and is, for example, a hash value. However, the data identification information is not limited to the hash value, but may be any information that can be uniquely derived from the data written in the logical device, by for example, performing some kind of calculation on the data. The LDEV implementation bit, the alteration prevention bit, the alteration prevention deadline, the migration-permitted start date, the migration-permitted deadline, the migration extension term, and the data identification information are set for each LDEV.

The data migration managing method according to this embodiment is described below in detail with reference to FIGS. 4 to 7.

FIG. 4 shows the configuration of migration management information retained by the data migration management software 22. The migration management information 220 includes a migration schedule template 221, storage group information 222, and a migration schedule table 223.

FIG. 5 shows the configuration of the migration schedule template 221. The data migration management software 22 manages the data migration by writing necessary information in the migration schedule template 221. More specifically, the data migration management software 22 sets a plurality of candidate storage systems from which data should be migrated during the alteration prevention term for the data, according to a migration schedule such as DLCM, and also sets information about the migration schedule, including the alteration prevention storage term, for each candidate storage system. When the alteration prevention storage deadline for a certain storage system has passed, the data migration to another storage system is carried out. As the storage system candidates, it is possible to select high-performance storage systems having disk drives with excellent access performance (such as Fibre Channel disk drives) to store data of high usage value. On the other hand, it is also possible to select storage systems having disk drives that exhibit lower access performance, but are inexpensive (such as ATA disk drives), in order to store data of low usage value. It is further possible to select storage systems having, for example, tape media with low management cost in order to store data of almost no usage value for a long period of time.

In the migration schedule template 221, reference numeral 311-1 indicates data identification information (for example, a hash value). Reference numeral 311-2 indicates a data size (capacity). Reference numeral 312-1 indicates a storage policy name for the data. Reference numeral 312-2 indicates the alteration prevention term. Reference numeral 312-3 indicates the number of destination storage systems to which the data is migrated. Reference numerals 313-1 to 313-B constitute migration management information 313 about a first storage system. Reference numeral 313-1 indicates the alteration prevention storage term of the first storage system. Reference numeral 313-2 indicates the alteration prevention storage start date of the first storage system. Reference numeral 313-3 indicates the alteration prevention storage deadline of the first storage system. Reference numeral 313-4 indicates the migration-permitted start date of the first storage system. The migration-permitted start date is indicated as the number of days passed since the alteration prevention storage deadline. Reference numeral 313-5 indicates the migration-permitted term of the first storage system. Reference numeral 313-6 indicates the migration extension term of the first storage system. Reference numeral 313-7 indicates the storage group name of the storage group to which the first storage system belongs. Reference numeral 313-8 indicates the vendor name for the first storage system. Reference numeral 313-9 indicates the device name of the first storage system. Reference numeral 313-A indicates the serial number of the first storage system. Reference numeral 313-B indicates the logical device number of the logical device storing the data among logical devices of the first storage system. Likewise, reference numerals 314-1 to 314-B constitute migration management information 314 about a second storage system, and reference numerals 315-1 to 315-B constitute migration management information 315 about an Nth storage system.

FIG. 6 shows the configuration of storage group information 222. In the storage group information 222, information (the vendor name, the device name, and the serial number) about the candidate storage systems to which the data should be migrated is registered for each storage group. In the storage group information 222, reference numeral 411-1 indicates a storage group name. Reference numeral 411-2 indicates the number of storage systems that belong to the storage group. Reference numerals 412-1 to 412-3 constitute information 412 about a first candidate storage system. Reference numeral 412-1 indicates the vendor name of the first candidate storage system. Reference numeral 412-2 indicates the device name of the first candidate storage system. Reference numeral 412-3 indicates the serial number of the first candidate storage system. Likewise, reference numerals 413-1, 413-2, and 413-3 constitute information 413 about a second candidate storage system, and reference numerals 414-1, 414-2, and 414-3 constitute information 414 about an Mth candidate storage system.

FIG. 7 shows the configuration of the migration schedule table 223. The table migration management software 22 prepares the migration schedule table 223 by registering the alteration prevention storage term, the migration-permitted start date, the migration-permitted term, the migration extension term, and the storage group name of each destination storage system, to which the data should be migrated, in the migration schedule template 221, according to data migration management such as DLCM. The data migration management software 22 schedules the data migration in consideration of, for example, a storage capacity required for the destination storage group, a remaining life span of the relevant device, data migration timing, the alteration prevention storage term, and the migration-permitted start date.

The data migration management software 22 carries out the data migration between the storage systems according to the schedule written in the migration schedule table 223. When carrying out the data migration, the data migration management software 22 refers to the information about the destination storage group name and searches for a storage system candidate to which the data should be migrated among the plurality of storage systems belonging to the relevant storage group. The data migration management software 22 acquires the alteration prevention storage term written in the migration schedule table 223 and selects a storage system that has a longer life span than the alteration prevention storage term. The data migration management software 22 further selects a logical device that has a storage capacity equal to or greater than that of the source logical device. It is possible to employ a configuration where the data migration is carried out only after the selected logical device is presented as the destination candidate to a storage manager and is acknowledged by the storage manager. It is also possible to employ a configuration where the selected logical device is automatically treated as the destination to which the data should be migrated, without requiring the storage manager's acknowledgement.

The storage groups for which the destination candidates for the data migration are registered are not limited to the existing storage systems, but may be virtual storage systems (for example, storage systems to be developed in the future). Accordingly, it is conceivable that when carrying out the data migration, all the storage systems belonging to the storage group that is the destination of the data migration may be virtual and nonexistent. In such a case, it is desirable that a mail be sent to the storage manager in order to instruct him/her to add any existing storage system(s) to the storage group. This mail can specify, for example, the target data to be migrated, the vendor name, device name, serial number, and logical device number of the source storage system, and the storage capacity required for the destination storage system. Addition of a storage system to the storage group may be performed manually by the storage manager or may be performed automatically by the data migration management software 22 by discovery of the storage system connected to a SAN 61.

In the migration schedule table 223, the vendor name, the device name, the serial number, and the logical device number of the source storage system from which the data should be migrated are unspecified (or to be decided), assuming the case where the destination storage system is virtual according to the data migration schedule as described above. The alteration prevention storage start date and the alteration prevention storage deadline of the destination storage system are unspecified (or to be decided) because such information should be decided after the data is actually migrated to the destination storage system.

Figure 8:
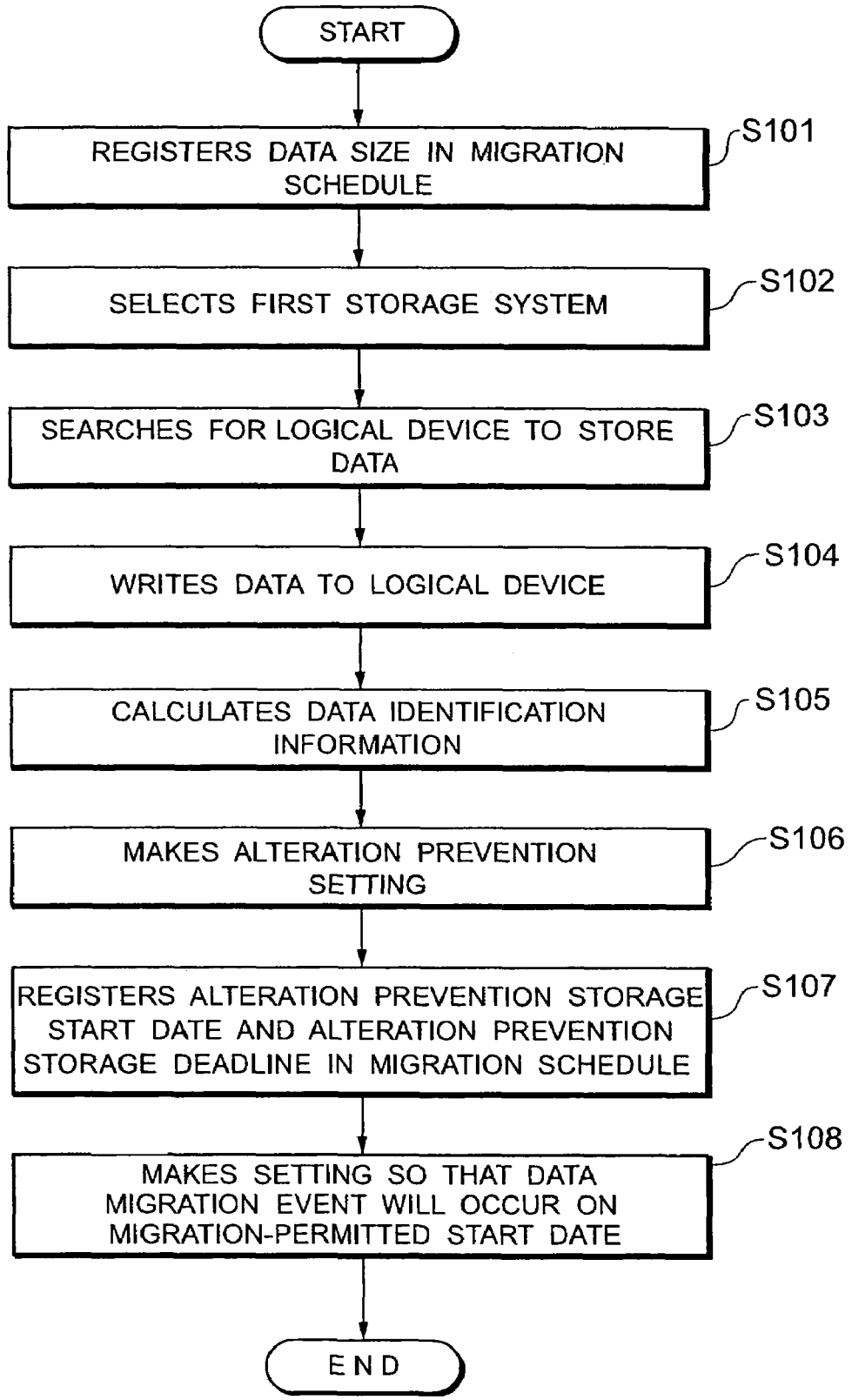
FIG. 8 is a flowchart of data migration management software processing.

FIG. 8 shows the processing executed by the data migration management software 22 to first write the alteration prevention target data to a storage system. The data migration management software 22 first writes the data size in the migration schedule table (S101). It then selects a first storage system to store the data and writes the vendor name, the device name, and the serial number of the first storage system in the migration management information 323 concerning the first storage system in the migration schedule table 223 (S102). Subsequently, the data migration management software 22 searches for the logical device to store the data and writes the logical device number in the migration management information 313 concerning the first storage system in the migration schedule table 223 (S103).

Next, the data migration management software 22 writes the data to the logical device (S104), and calculates and registers the data identification information in the migration schedule table 223 (S105). The data migration management software 22 then sets an alteration prevention setting for the logical device to which the data is written (S106). The processing of the alteration prevention setting will be described later in detail.

Subsequently, the data migration management software 22 registers the alteration prevention storage start date and the alteration prevention storage deadline in the migration management information 323 concerning the first storage system in the migration schedule table 223 (S107). The alteration prevention storage start date and the alteration prevention storage deadline are decided based on the date when the data is actually written. Next, the data migration management software 22 sets the system so that the data migration event will take place on the migration-permitted start date (S108).

Figure 9:
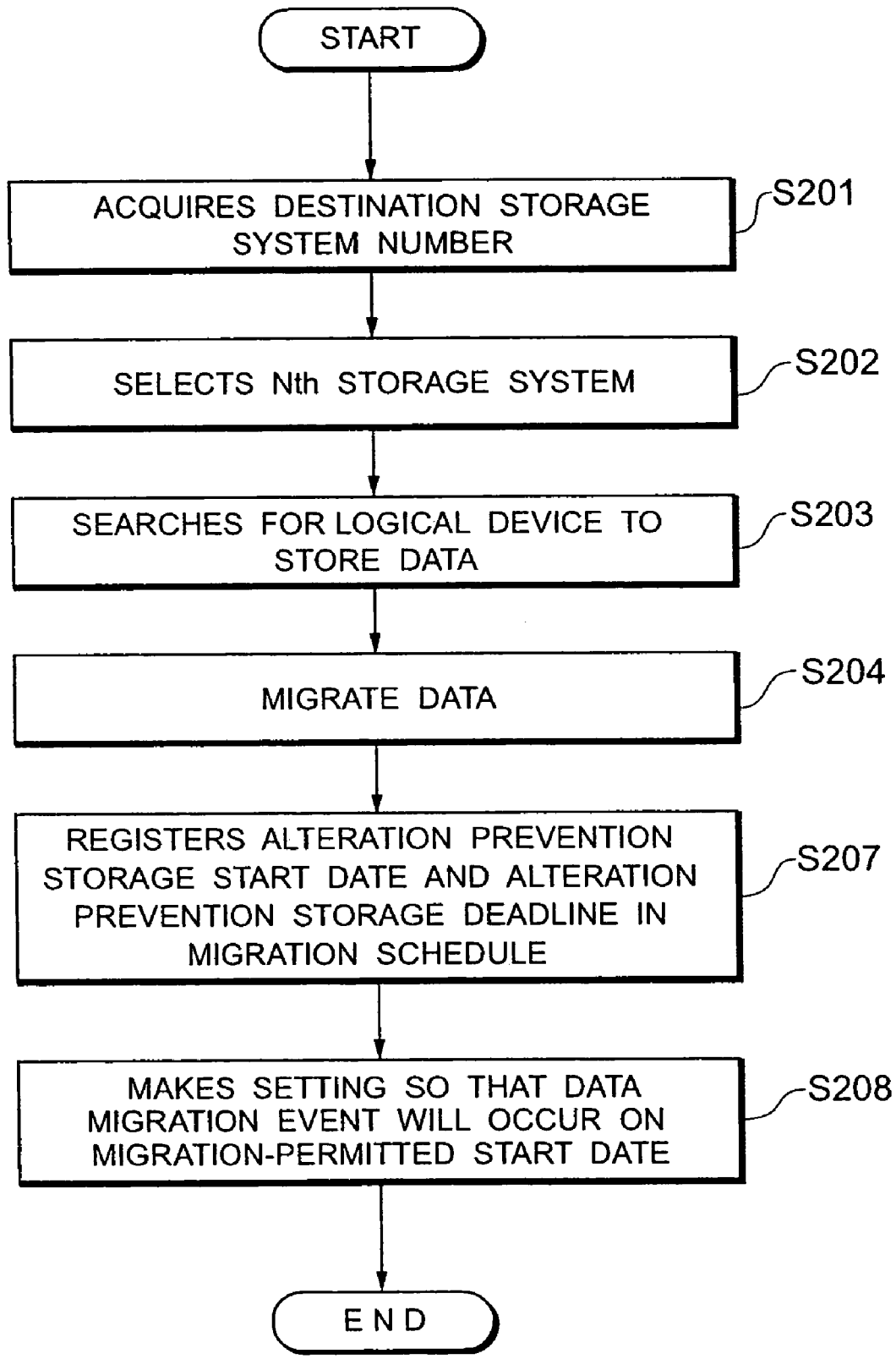
FIG. 9 is a flowchart of data migration management software processing.

FIG. 9 shows the processing executed by the data migration management software 22 when the data migration event takes place. When the data migration event occurs, the data migration management software 22 refers to the migration schedule table 223 and acquires number N of the next destination storage system (S201). The data migration management software 22 then selects the Nth storage system to store the data and writes the vendor name, the device name, and the serial number in migration management information 325 concerning the Nth storage system in the migration schedule table 223 (S202).

Subsequently, the data migration management software 22 searches for the logical device to store the data and writes the logical device number in the migration management information 325 concerning the Nth storage system in the migration schedule table 223 (S203). The data migration management software 22 then copies the data from the logical device of the (N−1)th storage system to the logical device of the Nth storage system (S204).

Next, the data migration management software 22 registers the alteration prevention storage start date and the alteration prevention storage deadline in the migration management information 325 concerning the Nth storage system in the migration schedule table 223 (S205). The data migration management software 22 then sets the system so that the data migration event will take place on the migration-permitted start date (S206).

Figure 10:
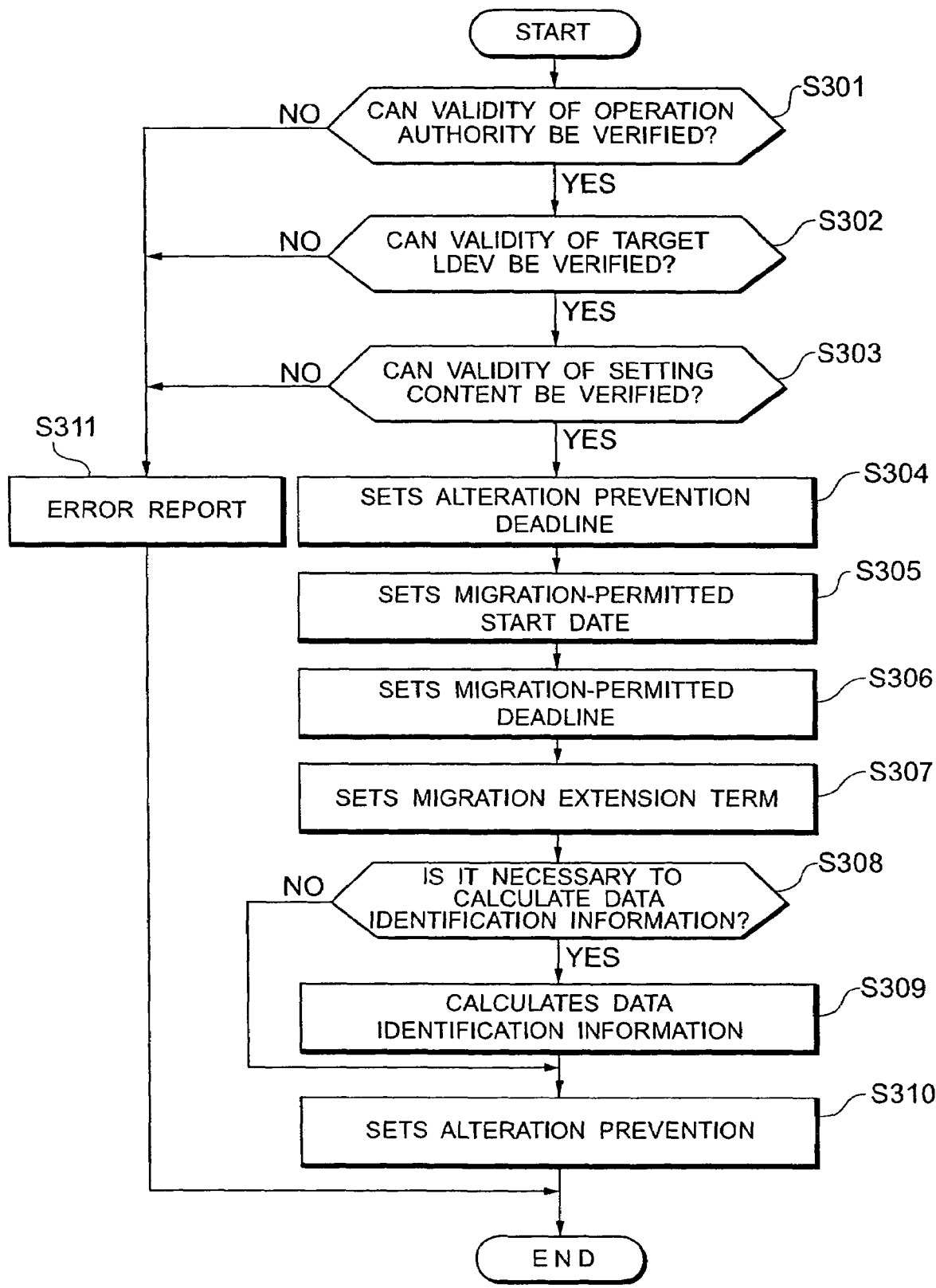
FIG. 10 is a flowchart of processing including the setting of LDEV control information.

FIG. 10 shows the processing executed by the storage system 10 to set, change, or cancel the LDEV control information 103. The LDEV control information 103 is set, changed, or cancelled in accordance with instructions from the data migration management software 22 as well as instructions from the console terminal 51. In order to set, change, or cancel the LDEV control information 103, the validity of the operation authority is first examined (S301). If the logical device, which is the target of the operation, is accessible from a plurality of controllers and if exclusive control is required, the above-mentioned examination is conducted by determining if the logical device has been locked to other controllers or not. If acquisition of a license is required in order to set, change, or cancel the LDEV control information 103, the above-mentioned examination is conducted by determining whether or not the host computer 31 or 32 or the console terminal 51 that has given the instruction has acquired the license.

If the validity of the operation authority is verified (S301: YES), the validity of the target LDEV is then examined (S302). This examination is conducted by determining whether or not the validity of the LDEV number of the LDEV that is the target of the operation can be verified, whether or not the logical device is implemented and in a normal operating state, and whether or not the alteration prevention setting, the migration-permitted start date, or other information of the logical device may be changed.

If the validity of the target LDEV is verified (S302: YES), the validity of the setting content is examined (S303). This examination is conducted by determining whether or not the alteration prevention bit is "0," whether or not the alteration prevention deadline already set is a future date later than the current date and time, whether or not the alteration prevention deadline to be set is a future date later than the alteration prevention deadline already set, whether or not the migration-permitted start date to be set is a future date later than the migration-permitted start date already set, whether or not the migration-permitted deadline to be set is a future date later than the migration-permitted deadline already set, whether or not the migration extension term to be set is equal to or longer than the migration extension term already set, whether or not the migration-permitted start date to be set is a future date later than the current date and time, and whether or not the migration-permitted deadline to be set is a future date later than the migration-permitted start date.

If the validity of the setting content is verified (S303: YES), the alteration prevention term, the migration-permitted start date, the migration-permitted deadline, and the migration extension term are then set (S304, S305, S306, and S307). Subsequently, it is determined whether it is necessary to calculate the data identification information or not (S308). For example, if it is only necessary to change the migration-permitted start date to a future date and time and it is unnecessary to change the data content written in the logical device, it is unnecessary to calculate the data identification information (S308: NO) and the processing proceeds to S310. On the other hand, if there is a possibility that the data identification information may change as in a case requiring data migration between the logical devices, it is necessary to calculate the data identification information (S308: YES) and the calculation of the data identification information takes place (S309). Finally, the alteration prevention setting is set by changing the alteration prevention bit from "0" to "1" (S310).

However, if the validity of the operation authority is not verified (S301: NO), or if the validity of the target LDEV is not verified (S302: NO), or if the validity of the setting content is not verified (S303: NO), the storage system 10 reports the error (S311) and the processing ends.

Figure 11:
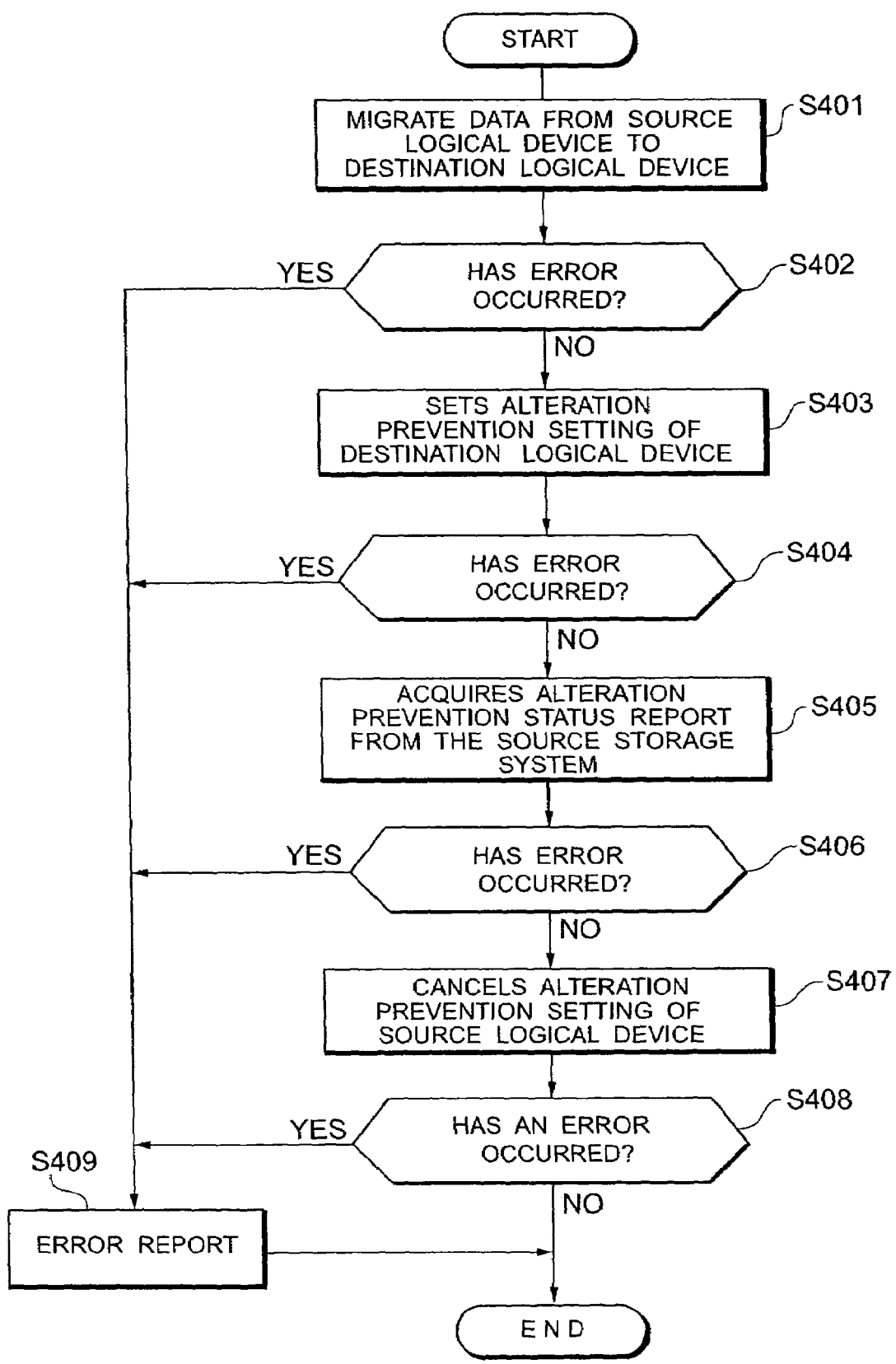
FIG. 11 is a flowchart of data migration management software processing.

FIG. 11 shows the processing executed by the data migration management software 22 when carrying out the data migration between the storage systems. The data migration management software 22 first copies the data from the logical device of the source storage system to the logical device of the destination storage system (S401). If no error occurs at the time of the data migration (S402: NO), the data migration management software 22 sets the alteration prevention setting of the destination logical device (S403). If no error occurs when setting the alteration prevention setting (S404: NO), the data migration management software 22 acquires an alteration prevention status report from the destination storage system (S405). The procedures for preparing the alteration prevention status report will be described later. If no error occurs when preparing the alteration prevention status report (S406: NO), the data migration management software 22 checks the alteration prevention status report; and when it acknowledges that the data has been migrated successfully without alteration, it cancels the alteration prevention setting of the logical device of the source storage system (S407). If no error occurs when canceling the alteration prevention setting (S408: NO), the processing ends. On the other hand, if an error occurs in any of the above-described steps S402, S404, S406, and S408, the data migration management software 22 reports the error (S409) and the processing ends.

Figure 12:
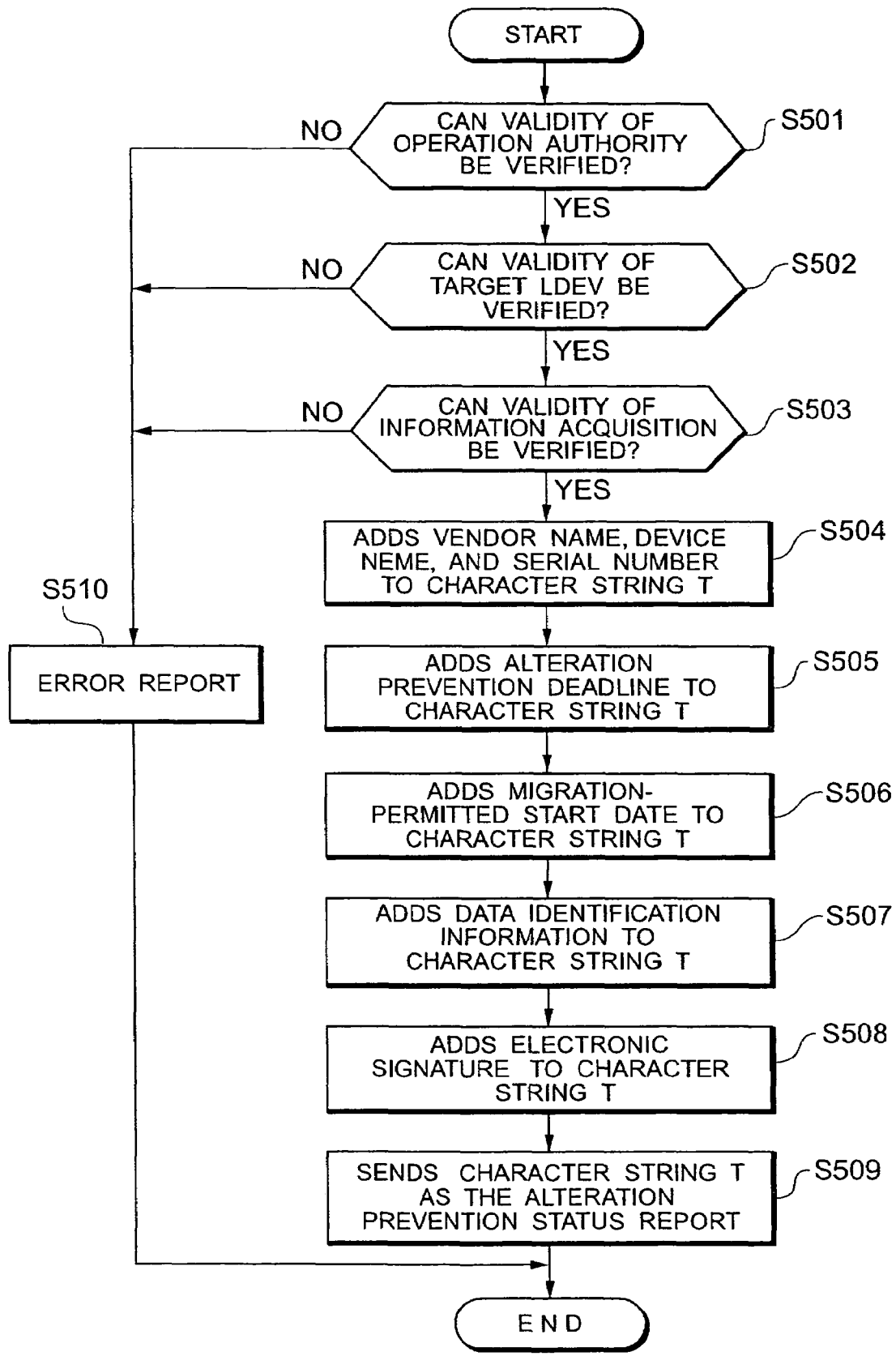
FIG. 12 is a flowchart of processing generating an alteration prevention status report.

FIG. 12 shows the processing for generating the alteration prevention status report at the destination storage system. The alteration prevention status report is an electronic certificate by which the destination storage system certifies that the data has been successfully migrated without alteration between the storage systems. In this example, the electronic certificate is illustrated as one composed of character string T. When generating the electronic certificate, the destination storage system first examines the validity of the operation authority concerning the logical device, and the validity of the target LDEV (S501 and S502). Since these examinations are similar to those of S301 and S302 described above regarding FIG. 10, explanation thereof is omitted. Then, the destination storage system examines the validity of information acquisition (S503). This examination is conducted by determining whether the target LDEV, from which the information should be read, has alteration prevention set or not.

If the validity of the information acquisition is verified (S503: YES), the destination storage system adds its own vendor name, device name, and serial number to character string T (S504). Moreover, the destination storage system adds the alteration prevention deadline, the migration-permitted start date, and the data identification information to character string T (S505, S506, and S507). Subsequently, the destination storage system encrypts character string T with its own private key and adds the electronic signature to character string T (S508). The destination storage system sends character string T with the electronic signature as the alteration prevention status report to the source storage system (S509). The electronic signature is sent via the management server 32 as stated above. However, if the validity of the operation authority cannot be verified (S501: NO), or if the validity of the target LDEV cannot be verified (S502: NO), or if the validity of the information acquisition cannot be verified (S503: NO), the destination storage system reports the error (S510) and the processing ends.

FIG. 13 shows an example of an alteration prevention status report. As shown in FIG. 13, the following information is included in the alteration prevention status report: the vendor name, device name, and serial number of the storage system which generated the report, the alteration prevention deadline, the migration-permitted start date, the data identification information (hash value), and the electronic signature. The vendor name, device name, and serial number of the storage system are added to the alteration prevention status report in order to uniquely identify the storage system which generated the electronic certificate.

Figure 14:
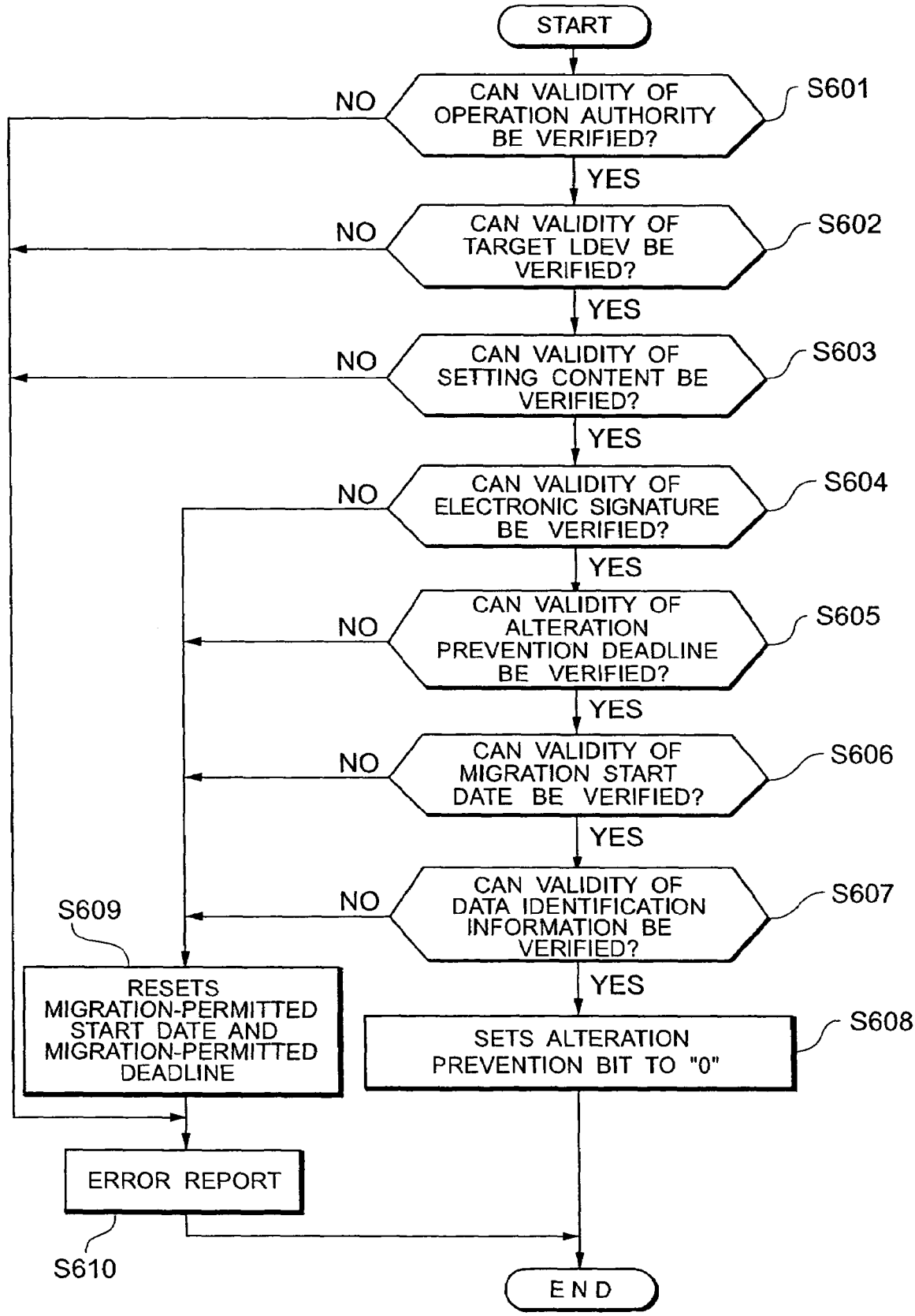
FIG. 14 is a flowchart of processing for the cancellation of the alteration prevention setting.

FIG. 14 shows the processing executed by the source storage system to cancel the alteration prevention setting of one of its logical devices conditional upon the source storage system acknowledging, according to the alteration prevention status report, the successful migration of the data without alteration to the destination storage system. The source storage system examines the validity of the operation authority concerning the logical device, the validity of the target LDEV, and the validity of the setting content (S601, S602, and S603). Since these examinations are similar to those in the above-described steps S301, S302, and S303 described above regarding FIG. 10, explanation thereof is omitted. If the validity of the operation authority cannot be verified (S601: NO), or if the validity of the target LDEV cannot be verified (S602), or if the validity of the setting content cannot be verified (S603: NO), the source storage system reports the error (S610) and the processing ends.

On the other hand, if all the results of the examinations in S601, S602, and S603 are YES, the source storage system examines the validity of the electronic signature in the alteration prevention status report sent from the destination storage system (S604). This examination can be carried out by decoding the electronic signature with the public key of the destination storage system (signer). If the validity of the electronic signature is verified (S604: YES), the source storage system examines the validity of the alteration prevention deadline included in the alteration prevention status report (S605). This examination is conducted by determining whether or not the alteration prevention deadline set for the source storage system coincides with the alteration prevention deadline included in the alteration prevention status report. If they coincide with each other, the validity of the alteration prevention deadline included in the alteration prevention status report is verified; and if they do not coincide with each other, the validity of the alteration prevention deadline included in the alteration prevention status report cannot be verified.

If the validity of the alteration prevention deadline is verified (S605: YES), the source storage system examines the validity of the migration-permitted start date included in the alteration prevention status report (S606). This examination is conducted by determining whether the migration-permitted start date included in the alteration prevention status report is a future date later than the current date and time. If the migration-permitted start date is a future date later than the current date and time, the validity of the migration-permitted start date is verified; and if the migration-permitted start date is a past date earlier than the current date and time, the validity of the migration-permitted start date cannot be verified.

If the validity of the migration-permitted start date is verified (S606: YES), the source storage system examines the validity of the data identification information included in the alteration prevention status report (S607). This examination is conducted by determining whether or not the data identification information set for the source storage system coincides with the data identification information included in the alteration prevention status report. If they coincide with each other, the validity of the data identification information included in the alteration prevention status report is verified; and if they do not coincide with each other, the validity of the data identification information included in the alteration prevention status report cannot be verified.

If the validity of the data identification information is verified (S607: YES), the source storage system changes the setting of the alteration prevention bit of the logical device from "1" to "0" (S608). As a result, this cancels the alteration prevention setting of the logical device. By initializing the logical device, it is possible to utilize the logical device to store other data even before the alteration prevention deadline. On the other hand, if the result of any of the examinations in S604 to S607 is NO, it is considered that the data migration was not carried out properly. Therefore, the source storage system resets the migration-permitted start date and the migration-permitted deadline (S609), thereby enabling the data migration to the destination storage system again. Subsequently, the source storage system reports the error (S610) and the processing ends.

Figure 15:
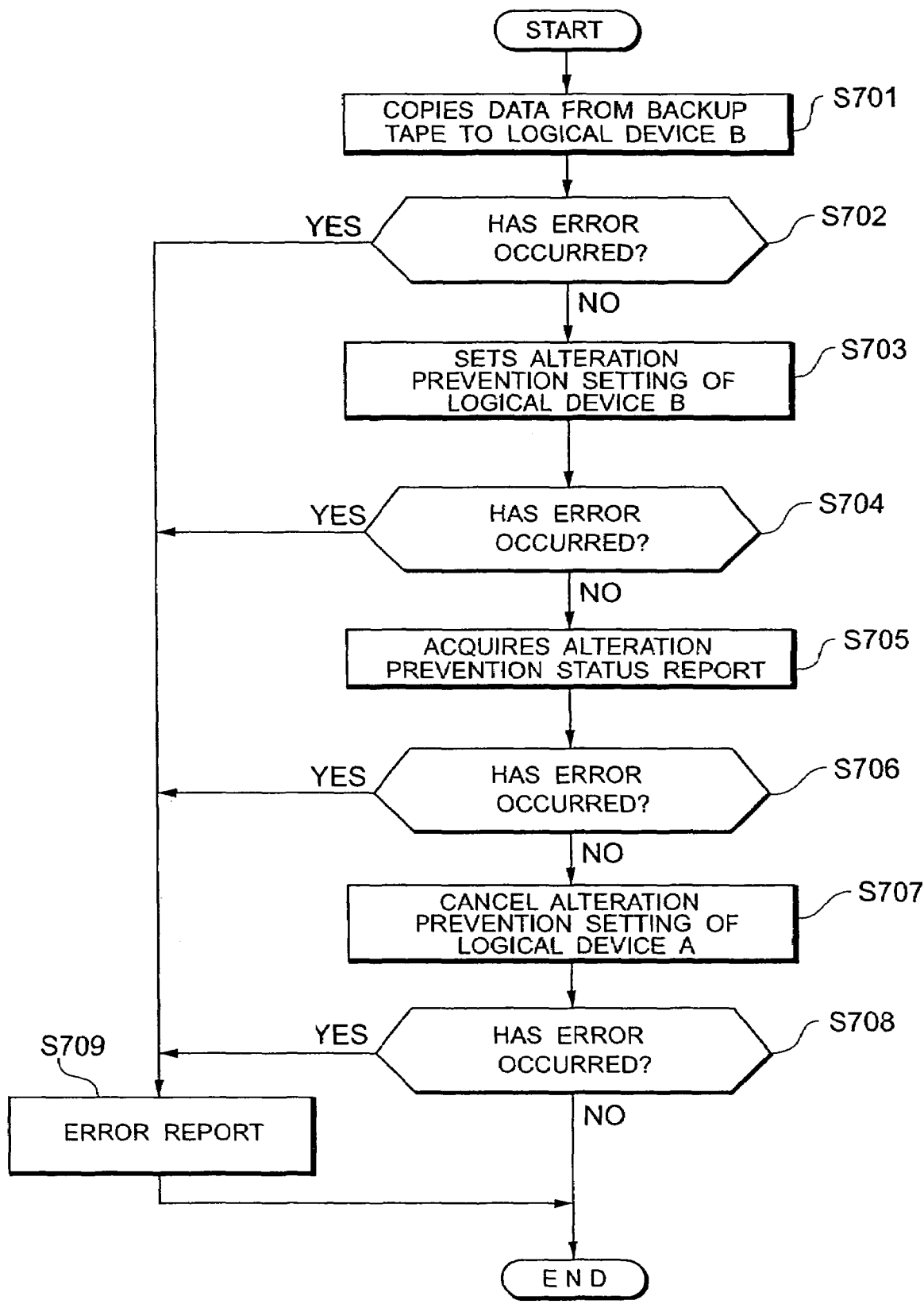
FIG. 15 is a flowchart of backup data recovery processing.

FIG. 15 shows the processing executed by the migration management software 22 to recover backup data. If any failure occurs in the logical device of the storage system 10, the migration management software 22 recovers the relevant data by using the backup data retained in the backup apparatus 80. For convenience of explanation, the following situation is indicated as an example: where a failure occurs in logical device A of the storage system 10, the migration management software 22 recovers the data to logical device B by using the backup data for logical device A that is stored in the backup apparatus 80. When a failure occurs in logical device A, a maintenance personnel member operates the console terminal 51 to change the migration-permitted start date and the migration-permitted deadline which are set for logical device A, thereby making the setting to enable the data migration from logical device A to another logical device.

When the data migration from logical device A to another logical device is made possible, the migration management software 22 first copies the data from the tape medium 81 to logical device B (S701). If no error occurs when copying the data (S702: YES), the migration management software 22 sets the alteration prevention setting of logical device B (S703). If no error occurs when making the alteration prevention setting (S704: YES), the migration management software 22 acquires the alteration prevention status report that indicates the migration of the data without alteration from the tape medium 81 to logical device B (S705). If no error occurs in the process of generating the alteration prevention status report (S706: YES), the migration management software 22 checks the alteration prevention status report. When the migration management software 22 acknowledges that the data has been migrated successfully without alteration from the tape medium 81 to logical device B, it cancels the alteration prevention setting of logical device A (S707). If no error occurs when canceling the alteration prevention setting (S708: YES), the processing ends. On the other hand, if an error occurs in any of the above-described steps S702, S704, S706, and S708, the migration management software 22 reports the error (S709) and the processing ends.

According to the embodiment of the present invention as described above, it is possible to reuse the logical device and thereby realize a reduction in data management cost by canceling the alteration prevention setting of the logical device on the condition that the data written in the logical device having the alteration prevention setting has been migrated without alteration to another logical device during the migration-permitted term.

It is also possible to automatically and strictly check whether the alteration has been prevented or not by confirming, with the alteration prevention status report with the electronic signature of the destination storage system, whether or not the data written in the logical device has been migrated without alteration to another logical device during the migration-permitted term.

Moreover, it is possible to realize a reduction in data management cost, as the host computer 32 manages the data migration between the storage systems according to the migration schedule table 223.

Any deadline such as the alteration prevention deadline, the alteration prevention storage deadline, and the migration-permitted deadline can be managed not only by the day, but also by the hour, minute, or second.

The present invention is not limited to the above-described embodiment. Those skilled in the art can make a variety of additions or changes within the scope of this invention.

What is claimed is:

1. A storage system comprising:
   a storage device for providing a first logical device;
   a control memory for storing control information to prevent alteration of data written to the first logical device; and
   a controller for controlling data reading from and writing to the first logical device, based on the control information;
   wherein the control information includes:
     an alteration prevention deadline that indicates a deadline for prohibiting alteration of data written to the first logical device;
     a migration-permitted term that indicates a term for permitting data migration to a second logical device by the alteration prevention deadline for the data written in the first logical device; and
     data identification information for identifying whether the data written in the first logical device has been altered or not; and
   wherein conditional upon the data written to the first logical device, which has an alteration prevention setting, having been migrated without alteration to the second logical device during the migration-permitted term, the controller cancels the alteration prevention setting of the first logical device.

2. The storage system according to claim 1, wherein the controller receives, from a destination storage system having the second logical device, an alteration prevention status report that indicates whether or not the data written in the first logical device has been migrated without alteration to the second logical device, and the controller determines based on the alteration prevention status report whether or not the data written in the first logical device has been migrated without alteration to the second logical device during the migration-permitted term.

3. The storage system according to claim 2, wherein if the controller fails to acquire the alteration prevention status report during the migration-permitted term, or if the controller acquires the alteration prevention status report during the migration-permitted term, but it can not be determined that the data written in the first logical device has been migrated without alteration to the second logical device during the migration-permitted term, the controller migrates the data written in the first logical device to the second logical device during a newly set migration-permitted term.

4. The storage system according to claim 2, wherein the alteration prevention status report includes:
   an alteration prevention deadline and a migration-permitted term which are set for the second logical device;
   data identification information for identifying whether or not the data migrated to the second logical device has been altered; and
   an electronic signature from the destination storage system;
   wherein the controller determines that the data written in the first logical device has been migrated without alteration to the second logical device during the migration-permitted term when the following conditions are satisfied:
      the validity of the electronic signature is verified;
      the alteration prevention deadline set for the second logical device is identical to the alteration prevention deadline set for the first logical device;
      a first day of the migration-permitted term set for the second logical device is a future date later than the current date; and
      the data identification information for the data written in the first logical device is identical to the data identification information for the data written to the second logical device.

5. The storage system according to claim 4, wherein the alteration prevention status report further includes a vendor name, a device name, and a serial number of the destination storage system.

6. A system for managing data migration between a first storage system and a second storage system,
   wherein the first storage system comprises:
      a first storage device for providing a first logical device;
      a first control memory for storing first control information to prevent alteration of data written to the first logical device; and
      a first controller for controlling data reading from and writing to the first logical device, based on the first control information;
   wherein the first control information includes:
      a first alteration prevention deadline that indicates a deadline for prohibiting alteration of data written to the first logical device;
      a first migration-permitted term that indicates a term for permitting data migration to a second logical device by the first alteration prevention deadline for the data written in the first logical device; and
      first data identification information for identifying whether the data written in the first logical device has been altered or not; and
   wherein the second storage system comprises:
      a second storage device for providing a second logical device;
      a second control memory for storing second control information to prevent alteration of data written to the second logical device; and
      a second controller for controlling data reading from and writing to the second logical device, based on the second control information;
   wherein the second control information includes:
      a second alteration prevention deadline that indicates a deadline for prohibiting alteration of data written to the second logical device;
      a second migration-permitted term that indicates a term for permitting data migration to a second logical device by the second alteration prevention deadline for the data written in the second logical device; and
      second data identification information for identifying whether the data written in the second logical device has been altered or not; and
   wherein the data migration management system comprises a migration schedule for managing at least the first alteration prevention deadline and the first migration-permitted term; and if the data written in the first logical device, which has an alteration prevention setting, has been migrated without alteration to the second logical device during the first migration-permitted term, the controller cancels the alteration prevention setting of the first logical device.

7. The data migration managing system according to claim 6, wherein the data migration managing system receives, from the second storage system, an alteration prevention status report that indicates whether or not the data written in the first logical device has been migrated without alteration to the second logical device, and the data migration managing system transfers the alteration prevention status report to the first storage system.

8. The data migration managing system according to claim 7, wherein if the first storage system fails to acquire the alteration prevention status report during the first migration-permitted term, or if the first storage system acquires the alteration prevention status report during the first migration-permitted term, but the data written in the first logical device fails to be migrated without alteration to the second logical device during the first migration-permitted term, the first migration-permitted term is newly set.

* * * * *